US007764601B2

(12) United States Patent
Murai

(10) Patent No.: US 7,764,601 B2
(45) Date of Patent: Jul. 27, 2010

(54) SWITCHING BETWEEN LAYER 2 SWITCHES AS DESTINATION OF IP PACKETS FROM CARDS

(75) Inventor: Masao Murai, Tokyo (JP)

(73) Assignee: NEC Corporation, Tokyo (JP)

( * ) Notice: Subject to any disclaimer, the term of this patent is extended or adjusted under 35 U.S.C. 154(b) by 806 days.

(21) Appl. No.: 11/291,826

(22) Filed: Dec. 2, 2005

(65) Prior Publication Data

US 2006/0120280 A1 Jun. 8, 2006

(30) Foreign Application Priority Data

Dec. 7, 2004 (JP) ............................ 2004-354306

(51) Int. Cl.
*H04L 12/66* (2006.01)
(52) U.S. Cl. ...................... 370/219; 370/217; 370/218; 370/355
(58) Field of Classification Search ......... 370/216–221, 370/225–227, 230, 235, 242, 243, 246, 315, 370/328, 395.5, 465, 466; 455/8, 15, 16
See application file for complete search history.

(56) References Cited

U.S. PATENT DOCUMENTS

| 5,473,599 | A | 12/1995 | Li et al. | |
|---|---|---|---|---|
| 6,738,392 | B1 | 5/2004 | Thurston | |
| 7,079,504 | B1 * | 7/2006 | Leung et al. | ................. 370/312 |
| 7,275,175 | B2 * | 9/2007 | Cardona et al. | ................. 714/4 |
| 7,356,013 | B2 * | 4/2008 | Linder et al. | ................. 370/338 |
| 2003/0223466 | A1 | 12/2003 | Noronha, Jr. et al. | |
| 2004/0009773 | A1 * | 1/2004 | Kato | ........................... 455/445 |
| 2004/0047286 | A1 | 3/2004 | Larsen et al. | |
| 2004/0176023 | A1 * | 9/2004 | Linder et al. | ................. 455/3.01 |
| 2005/0272450 | A1 * | 12/2005 | Kato | ........................... 455/461 |

FOREIGN PATENT DOCUMENTS

| EP | 1282320 A2 * | 2/2003 |
|---|---|---|
| JP | 2-246646 | 10/1990 |
| JP | 5-344144 | 12/1993 |
| JP | 9-135244 | 5/1997 |

(Continued)

OTHER PUBLICATIONS

Wunnava, S.V. et al., "Secure Multimedia Activity with Redundant Schemes," IEEE SoutheastCo, Apr. 2002, pp. 333-337.*

(Continued)

*Primary Examiner*—Donald L Mills
(74) *Attorney, Agent, or Firm*—Whitham, Curtis, Christofferson & Cook, P.C.

(57) ABSTRACT

A layer 2 switch switching circuit has two layer 2 switches of a redundant configuration and a plurality of cards for sending IP packets to each other through either one of the two layer 2 switches. Each of the two layer 2 switches has a state signal delivery unit for delivering a state signal representing whether the layer 2 switch is in an active state or a standby state. Each of the cards has a card controller for monitoring states of the two layer 2 switches based on state signals sent respectively from the two layer 2 switches, and switching between the two layer 2 switches as a destination of IP packets based on the monitored states.

12 Claims, 7 Drawing Sheets

FOREIGN PATENT DOCUMENTS

| | | |
|---|---|---|
| JP | 2003-234757 | 8/2003 |
| WO | WO 9812832 A1 * | 3/1998 |
| WO | WO 03090106 A1 * | 10/2003 |
| WO | WO 2004/010653 | 1/2004 |
| WO | WO 2004/028102 | 4/2004 |

OTHER PUBLICATIONS

Matsuoka, H., et al., "End-to-End Robust IP Soft Handover," IEEE International Conference on Communications, ICC '03, May 2003, vol. 1, pp. 532-536.*

European Search Report dated Feb. 14, 2006.

* cited by examiner

SWITCHING BETWEEN LAYER 2 SWITCHES AS DESTINATION OF IP PACKETS FROM CARDS

BACKGROUND OF THE INVENTION

1. Field of the Invention

The present invention relates to a technology for switching between two layer 2 switches as a destination of IP packets from a plurality of cards of a base station apparatus which transmit IP packets through either one of the two layer 2 switches. A layer 2 switch refers to a switch for delivering an IP packet depending on the data of the IP packet in a layer 2 (data link layer).

2. Description of the Related Art

Generally, redundant configurations include a dual active system configuration having two systems both used as active systems and an active-backup system configuration having two systems used as an active system and a backup system, respectively. Active-backup system configurations are disclosed in JP-A-1999-246646, JP-A-1993-344144, JP-A-1997-135244, and JP-A-2003-234757 (hereinafter referred to as Documents 1 through 4, respectively).

Dual active and active-backup schemes need to be used differently depending on the system architecture that is involved. For example, a terminating unit for terminating a transmission path is generally installed in each transmission path. If a system architecture has a plurality of such transmission paths, then each transmission path with a terminating unit installed therein is used as an active system, and two such active systems are used as a dual active system configuration. If the system architecture has only one transmission path, then a plurality of terminating units are combined with the transmission path, and only the terminating units are provided in a redundant configuration. One of the terminating units belongs to an active system, and the other terminating units to a backup system, resulting in an active-backup system. Even the same system architecture needs to be compatible with either of the dual active system and the active-backup system depending on the transmission path or paths.

Layer 2 switches usually forward IP packets received from cards in a system to corresponding cards. The layer 2 switches also forward IP packets received from transmission paths to corresponding cards. Therefore, layer 2 switches may be mounted in terminating units. The layer 2 switches need to be compatible with either of the dual active system and the active-backup system.

The technologies disclosed in Documents 1 through 4 referred to above are related to active-backup system configurations, but not dual active system configurations. If a layer 2 switch that operates in an active system suffers a fault, then each card is required to switch the destination of IP packets to a layer 2 switch in another active system or a backup system. Heretofore, however, a dedicated device such as a controller disclosed in Document 4 is necessary for switching between layer 2 switches as a destination of IP packets.

A layer 2 switch includes therein a buffer for holding IP packets. When the destination of IP packets is switched from a layer 2 switch to another layer 2 switch, IP packets in the past remain held in the layer 2 switch which was active prior to the switching, tending to result in a packet loss. Such a packet loss may be eliminated by sending at all times replicas of IP packets to the layer 2 switch to which the destination of IP packets is switched. However, this process is subject to the danger of a duplication of IP packets during the switching.

Generally, IP networks are not supposed to guarantee a sequence of IP packets. However, if a sequence of IP packets is not guaranteed, then a receiver of the IP packets needs to perform some process of correcting the sequence in which the IP packets are received. A closed network in an apparatus, e.g., an IP network constructed only within an apparatus, can simplify the reception process of each card by guaranteeing a sequence of IP packets. Closed IP networks in apparatus are thus desirous of having layer 2 switches of a redundant configuration which are capable of guaranteeing a sequence of IP packets.

SUMMARY OF THE INVENTION

It is an object of the present invention to provide a layer 2 switch switching circuit, a base station apparatus, and a layer 2 switch switching method which are capable of switching between layer 2 switches as a destination of IP packets from each card without the need for a dedicated device, and which are compatible with both an active-backup system configuration and a dual active system configuration.

Another object of the present invention is to provide a layer 2 switch switching circuit, a base station apparatus, and a layer 2 switch switching method which are capable of preventing a packet loss, a duplication, and a scrambled sequence of IP packets when a destination of IP packets is switched from a layer 2 switch to another layer 2 switch.

A layer 2 switch switching circuit according to the present invention has two layer 2 switches of a redundant configuration and a plurality of cards for sending IP packets to each other through either one of the two layer 2 switches. Each of the two layer 2 switches has a state signal delivery unit for delivering a state signal representing whether the layer 2 switch is in an active state or a standby state. Each of the cards has a card controller for monitoring states of the two layer 2 switches based on state signals sent respectively from the two layer 2 switches, and switching between the two layer 2 switches as a destination of IP packets based on the monitored states.

With the above arrangement, even if one of the two layer 2 switches is put into the standby state when the two layer 2 switches are in the active state in a dual active system configuration, each of the cards is capable of automatically switching a destination of IP packets from the layer 2 switch which is put into the standby state to the layer 2 switch which is continuously in the active state. It is thus possible to switch from the active state of both the two layer 2 switches to the active state of one of the two layer 2 switches only.

Furthermore, when the two layer 2 switches are in an active-backup system configuration with one of them in the active state and the other in the standby state, if the layer 2 switch in an active system changes from the active state to the standby state, each of the cards can automatically switch the destination of IP packets from the layer 2 switch that is in the active state to the layer 2 switch that is in the standby state. Therefore, the two layer 2 switches can switch between the active system and the backup system.

As described above, regardless of whether the redundant configuration is either the dual active system configuration or the active-backup system configuration, the destination of IP packets from the cards can be switched without the need for a dedicated device which has heretofore been required. Since the destination of IP packets from the cards can be switched in either the dual active system configuration or the active-backup system configuration, the layer 2 switch switching circuit is highly flexible as it is compatible with both the dual active system configuration and the active-backup system configuration.

Each of the two layer 2 switches further includes an internal buffer and a switch controller. The internal buffer temporarily stores IP packets. The switch controller monitors the state of the other layer 2 switch based on the state signal delivered from the other layer 2 switch, stops sending IP packets to the corresponding card when a transition of the other layer 2 switch from the active state to the standby state is detected, and resumes sending IP packets to the corresponding card when the other layer 2 switch completes sending all IP packets held by the internal buffer thereof.

With this arrangement, even when each of the layer 2 switches detects when the companion layer 2 switch changes from the active state to the standby state, it waits until the transmission of all the IP packets held by the internal buffer of the companion layer 2 switch is completed. Therefore, it is possible to prevent a packet loss from occurring which would be caused if past IP packets remain in the companion layer 2 switch. As a packet loss is prevented from occurring, it is not necessary to send at all times replicas of IP packets from the layer 2 switch from which the destination of IP packets is to be switched to the layer 2 switch to which the destination of IP packets is to be switched, and hence a duplication of IP packets is avoided. Furthermore, because each of the layer 2 switches resumes sending IP packets after the transmission of all the IP packets held by the internal buffer of the companion layer 2 switch is completed, the sequence of IP packets sent to cards is prevented from being scrambled.

If the switch controller receives IP packets from the cards while the switch controller is stopping sending IP packets to the corresponding card when the transition of the other layer 2 switch from the active state to the standby state is detected, the switch controller stores the received IP packets in the internal buffer. The switch controller resumes sending the IP packets stored in the internal buffer to the corresponding card when the other layer 2 switch completes sending all IP packets held by the internal buffer thereof.

With this arrangement, each of the cards is capable of sending IP packets to the layer 2 switches even while the destination of IP packets is being changed. Inasmuch as there is no need to hold IP packets in each of the cards, each of the cards may be simplified in arrangement, and may be manufactured at a reduced cost.

The above and other objects, features, and advantages of the present invention will become apparent from the following description with reference to the accompanying drawings which illustrate examples of the present invention.

DESCRIPTION OF THE PREFERRED EMBODIMENTS

Figure 1:
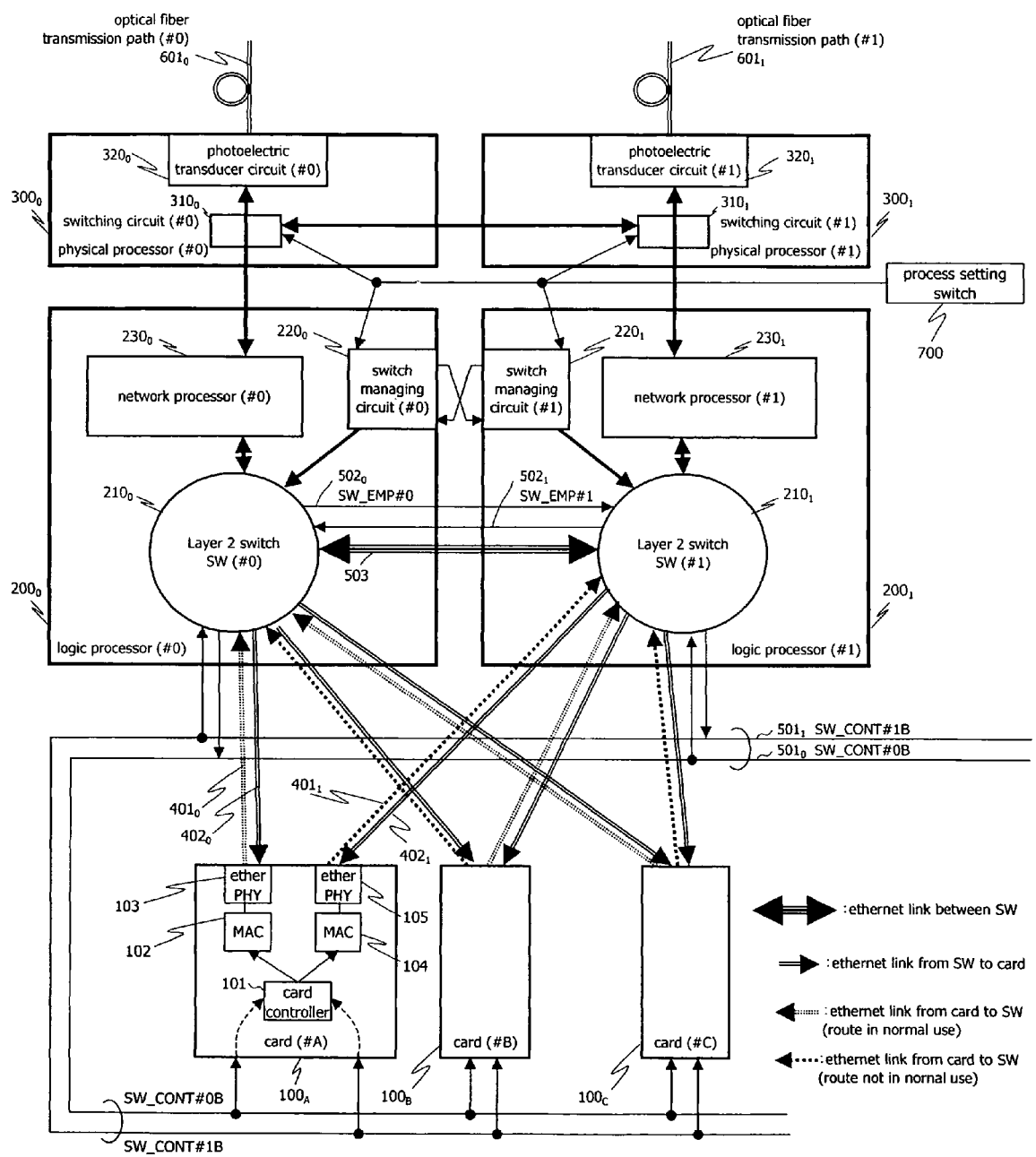
FIG. 1 is a block diagram of a layer 2 switch switching circuit according to an embodiment of the present invention as it is incorporated in a dual active system.
Figure 2:
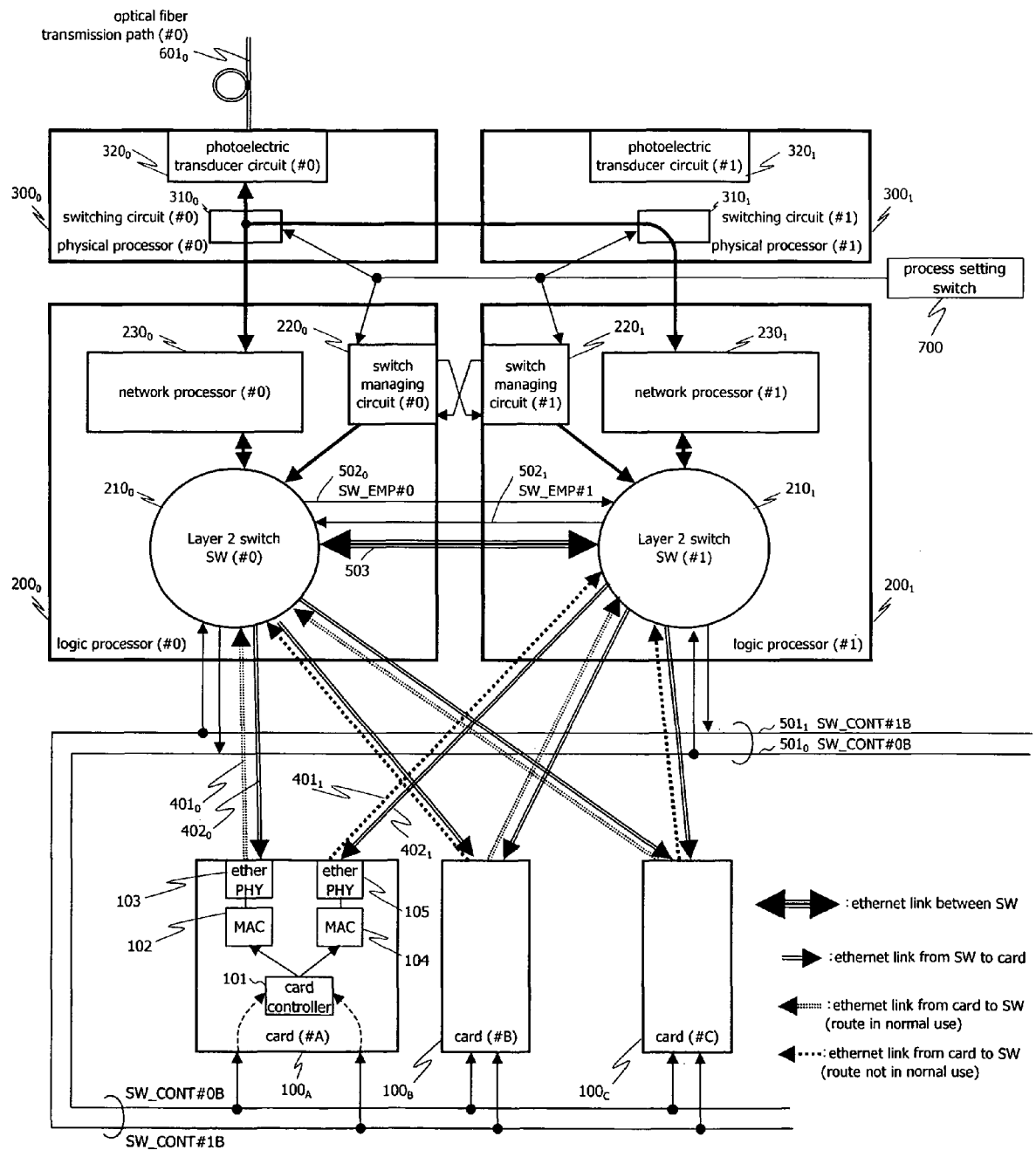
FIG. 2 is a block diagram of the layer 2 switch switching circuit according to the embodiment of the present invention as it is incorporated in an active-backup system.

A layer 2 switch switching circuit according to an embodiment of the present invention is illustrated in FIGS. 1 and 2. The layer 2 switch switching circuit illustrated in FIG. 1 and the layer 2 switch switching circuit illustrated in FIG. 2 are identical in structure with each other. However, FIG. 1 shows the layer 2 switch switching circuit as it is incorporated in a dual active system, and FIG. 2 shows the layer 2 switch switching circuit as it is incorporated in an active-backup system.

As shown in FIGS. 1 and 2, the layer 2 switch switching circuit according to the embodiment of the present invention has a plurality of cards (#A through #C) $100_A$ through $100_C$, logic processor (#0) $200_0$ and physical processor (#0) $300_0$ belonging to system 0, logic processor (#1) $200_1$ and physical processor (#1) $300_1$ belonging to system 1, and process setting switch 700. The layer 2 switch switching circuit is installed in a wireless or wired base station apparatus.

Though only three cards (#A through #C) $100_A$ through $100_C$ are illustrated in FIGS. 1 and 2, the number of cards is not limited insofar as a plurality of cards are employed. Physical processors (#0, #1) $200_0$, $300_1$ comprise cards that are generally referred to as physical layer cards. However, these physical processors will be referred to as physical processors in order to avoid confusion with cards (#A through #C) $100_A$ through $100_C$. Similarly, logic processors (#0, #1) $200_0$, $200_1$ comprise cards that are generally referred to as highway cards, and will be referred to as logic processors.

The layer 2 switch switching circuit according to the embodiment of the present invention is of a redundant configuration including system 0 and system 1, and is capable of operating in a full active system configuration wherein both system 0 and system 1 are active systems and an active-dual system configuration wherein one of system 0 and system 1 is an active system and the other a backup system. IP packets are used to transmit information between cards (#A through #C) $100_A$ through $100_C$. Layer 2 switches SW (#0, #1) $210_0$, $210_1$ are duplexed and provided in logic processors (#0, #1) $200_0$, $200_1$, respectively. All IP packets are delivered through either one of layer 2 switches SW (#0, #1) $210_0$, $210_1$.

Physical processor (#0) $300_0$ is connected to optical fiber transmission path (#0) $601_0$ as an external link of system 0. Physical processor (#0) $300_0$ has switching circuit (#0) $310_0$ and photoelectric transducer circuit (#0) $320_0$. Photoelectric transducer circuit (#0) $320_0$ converts an IP packet transmitted as an optical signal through optical fiber transmission path (#0) $601_0$ into an electric signal. Switching circuit (#0) $310_0$ switches the destination of the IP packet as the electric signal from photoelectric transducer circuit (#0) $310_0$ to either logic processor (#0) $200_0$ only or both logic processor (#0) $200_0$ and companion physical processor (#1) $300_1$. Switching circuit (#0) $310_0$ also switches the destination of an IP packet from logic processor (#0) $200_0$ to either photoelectric transducer circuit (#0) $320_0$ only or both photoelectric transducer circuit (#0) $320_0$ and companion physical processor (#1) $300_1$. Photoelectric transducer circuit (#0) $320_0$ also converts an IP packet sent as an electric signal from switching circuit (#0) $310_0$ into an optical signal, and outputs the IP packet as the optical signal to optical fiber transmission path (#0) $601_0$.

Logic processor (#0) $200_0$ has layer 2 switch SW (#0) $210_0$, switch managing circuit (#0) $220_0$, and network processor (#0) $230_0$. Network processor (#0) $230_0$ converts an IP packet from physical processor (#0) $300_0$ into a packet format for use in the layer 2 switch switching circuit. Layer 2 switch SW (#0) $210_0$ delivers the packet from network processor (#0) $230_0$ to a corresponding one of cards (#A through #C) $100_A$ through $100_C$. Switch managing circuit (#0) $220_0$ outputs a state instruction signal for putting layer 2 switch SW (#0) $210_0$ into an active state or a standby state to layer 2 switch SW (#0) $210_0$. Layer 2 switch SW (#0) $210_0$ also delivers packets from cards (#A through #C) $100_A$ through $100_C$ to corresponding cards, and outputs them to network processor (#0) $230_0$. Network processor (#0) $230_0$ also converts a packet from layer 2 switch SW (#0) $210_0$, which is in the packet format for use in the layer 2 switch switching circuit, to an IP packet of the original format, and sends the IP packet to physical processor (#0) $300_0$.

Similarly, physical processor (#1) $300_1$ is connected to optical fiber transmission path (#1) $601_1$ as an external link of system 1. Physical processor (#1) $300_1$ has switching circuit (#1) $310_1$ and photoelectric transducer circuit (#1) $320_1$. Photoelectric transducer circuit (#1) $320_1$ converts an IP packet transmitted as an optical signal through optical fiber transmission path (#1) $601_1$ into an electric signal. Switching circuit (#1) $310_1$ switches the destination of the IP packet as the electric signal from photoelectric transducer circuit (#1) $320_1$ to either logic processor (#1) $200_1$ only or both logic processor (#1) $200_1$ and companion physical processor (#0) $300_0$. Switching circuit (#1) $310_1$ also switches the destination of an IP packet from logic processor (#1) $200_1$ to either photoelectric transducer circuit (#1) $320_1$ only or both photoelectric transducer circuit (#1) $320_1$ and companion physical processor (#0) $300_0$. Photoelectric transducer circuit (#1) $320_1$ also converts an IP packet sent as an electric signal from switching circuit (#1) $310_1$ into an optical signal, and outputs the IP packet as the optical signal to optical fiber transmission path (#1) $601_1$.

Logic processor (#1) $200_1$ has layer 2 switch SW (#1) $210_1$, switch managing circuit (#1) $220_1$, and network processor (#1) $230_1$. Network processor (#1) $230_1$ converts an IP packet from physical processor (#1) $300_1$ into a packet format for use in the layer 2 switch switching circuit. Layer 2 switch SW (#1) $210_1$ delivers the packet from network processor (#1) $230_1$ to a corresponding one of cards (#A through #C) $100_A$ through $100_C$. Switch managing circuit (#1) $220_1$ outputs a state instruction signal for putting layer 2 switch SW (#1) $210_1$ into an active state or a standby state to layer 2 switch SW (#1) $210_1$. Layer 2 switch SW (#1) $210_1$ also delivers packets from cards (#A through #C) $100_A$ through $100_C$ to corresponding cards, and outputs them to network processor (#1) $230_1$. Network processor (#1) $230_1$ also converts a packet from layer 2 switch SW (#1) $210_1$, which is in the packet format for use in the layer 2 switch switching circuit, to an IP packet of the original format, and sends the IP packet to physical processor (#1) $300_1$.

Figure 3:
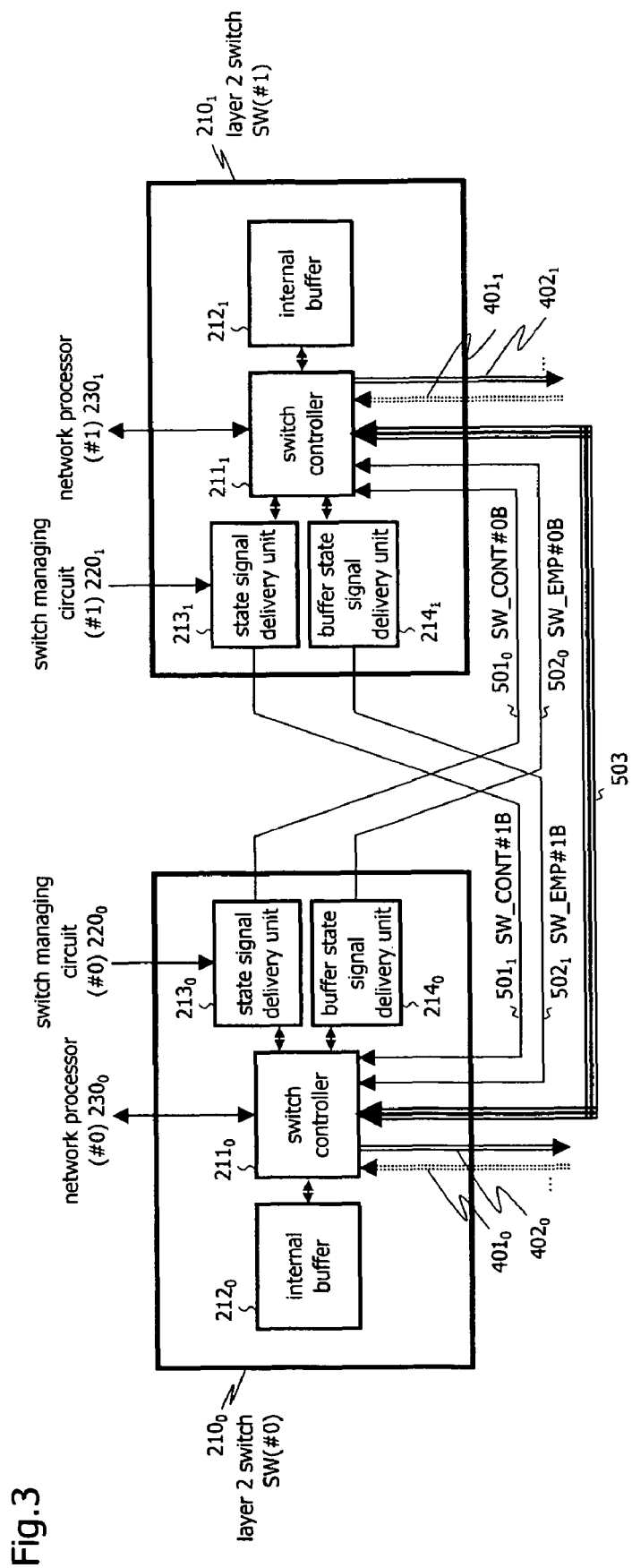
FIG. 3 is a block diagram of layer 2 switches shown in FIGS. 1 and 2.

As shown in FIG. 3, layer 2 switch SW (#0) $210_0$ has switch controller $211_0$, internal buffer $212_0$, state signal delivery unit $213_0$, and buffer state signal delivery unit $214_0$. Based on a state instruction signal from switch managing circuit (#0) $220_0$, state signal delivery unit $213_0$ delivers a state signal indicative of whether it is in an active state or a standby state to signal line SW_CONT#0B $501_0$. If state signal delivery unit $213_0$ is in the active state (ACT), then it sets the state signal to logic "0". Internal buffer $212_0$ temporarily stores IP packets from cards (#A through #C) $100_A$ through $100_C$ and network processor (#0) $230_0$. Buffer state signal delivery unit $214_0$ delivers a buffer state signal indicative of whether internal buffer $212_0$ stores an IP packet or not to signal line SW_EMP#0B $502_0$. If internal buffer $212_0$ is empty, then buffer state signal delivery unit $214_0$ sets the buffer state signal to logic "1". Switch controller $211_0$ controls layer 2 switch SW (#0) $210_0$ in its entirety.

Layer 2 switch SW (#1) $210_1$ has switch controller $211_1$, internal buffer $212_1$, state signal delivery unit $213_1$, and buffer state signal delivery unit $214_1$. Based on a state instruction signal from switch managing circuit (#1) $220_1$, state signal delivery unit $213_1$ delivers a state signal indicative of whether it is in an active state or a standby state to signal line SW_CONT#1B $501_1$. If state signal delivery unit $213_1$ is in the active state (ACT), then it sets the state signal to logic "0". Internal buffer $212_1$ temporarily stores IP packets from cards (#A through #C) $100_A$ through $100_C$ and network processor (#1) $230_1$. Buffer state signal delivery unit $214_1$ delivers a buffer state signal indicative of whether internal buffer $212_1$ stores an IP packet or not to signal line SW_EMP#1B $502_1$. If internal buffer $212_1$ is empty, then buffer state signal delivery unit $214_1$ sets the buffer state signal to logic "1". Switch controller $211_1$ controls layer 2 switch SW (#1) $210_1$ in its entirety.

Signal line SW_CONT#0B $501_0$ is connected to companion layer 2 switch SW (#1) $210_1$, and signal line SW_CONT#1B $501_1$ is connected to companion layer 2 switch SW (#0) $210_0$. Therefore, layer 2 switches SW (#0, #1) $210_0$, $210_1$ are capable of monitoring the states of the companion layer 2 switches. Signal lines SW_CONT#0B $501_0$, SW_CONT#1B $501_1$ are connected to all cards (#A through #C) $100_A$ through $100_C$. Therefore, cards (#A through #C) $100_A$ through $100_C$ are capable of monitoring the states of layer 2 switches SW (#0, #1) $210_0$, $210_1$. When sending IP packets, cards (#A through #C) $100_A$ through $100_C$ thus can determine which one of layer 2 switches SW (#0, #1) $210_0$, $210_1$ they should send IP packets to.

Signal SW_EMP#1B $502_1$ is connected to layer 2 switch SW (#0) $210_0$. Therefore, layer 2 switch SW (#0) $210_0$ is capable of monitoring the state of internal buffer $212_1$ of companion layer 2 switch SW (#1) $210_1$. Signal SW_EMP#0B $502_0$ is connected to layer 2 switch SW (#1) $210_1$. Therefore, layer 2 switch SW (#1) $210_1$ is capable of monitoring the state of internal buffer $212_0$ of companion layer 2 switch SW (#0) $210_0$.

In FIGS. 1 and 2, each of cards (#A through #C) $100_A$ through $100_C$ comprises a card referred to as a call processing control card, a baseband processing card, a transmission/reception card, or a monitoring control card in a wireless base station apparatus or the like. Each of cards (#A through #C) $100_A$ through $100_C$ is connected to Ethernet links $401_0$, $402_0$, and send IP packets to and receive IP packets from layer 2 switch SW (#0) $210_0$ through Ethernet links $401_0$, $402_0$. Each of cards (#A through #C) $100_A$ through $100_C$ is also connected to Ethernet links $401_1$, $402_1$, and send IP packets to and receive IP packets from layer 2 switch SW (#1) $210_1$ through Ethernet links $401_1$, $402_1$.

Each of cards (#A through #C) $100_A$ through $100_C$ has card controller 101 serving as a CPU (Central Processing Unit), MAC (Media Access Control) circuits 102, 104, and PHY (PHYsical layer) circuits 103, 105. PHY circuit 103 and MAC circuit 102 correspond respectively to Ethernet links $401_0$, $402_0$, and PHY circuit 105 and MAC circuit 104 correspond respectively to Ethernet links $401_1$, $402_1$. Card controller 101 is connected to two MAC circuits 102, 104 and sends and receives IP packets through one or both of MAC circuits 102, 104. Each of PHY circuits 103, 105 comprises an LSI (Large Scale Integration) circuit for detecting data in layer 1 at the front end of an IP packet. Each of MAC circuits 102, 104 comprises an LSI circuit for analyzing the destination of an IP packet based on data in layer 2 of the IP packet, correcting errors of IP packets, and managing MAC addresses.

Process setting switch 700 is a switch for setting the layer 2 switch switching circuit to either an active-backup system configuration or a dual active system configuration. Process setting switch 700 is manually operated by the user. Process setting switch 700 applies its logic output signal to switch managing circuit (#0) $220_0$ of logic processor (#0) $200_0$, switch managing circuit (#1) $220_1$ of logic processor (#1) $200_1$, switching circuit (#0) $310_0$ of physical processor (#0) $300_0$, and switching circuit (#1) $310_1$ of physical processor (#1) $300_1$.

In the example shown in FIG. 1, the layer 2 switch switching circuit is set to the dual active system configuration by process setting switch 700, and is connected to both optical fiber transmission path (#0) $601_0$ and optical fiber transmission path (#1) $601_1$ which serve as active system links. In the present example, an IP packet transmitted as an optical signal through optical fiber transmission path (#0) $601_0$ is converted by photoelectric transducer circuit (#0) $320_0$ of physical processor (#0) $300_0$ into an electric signal, which is output from switching circuit (#0) $310_0$ to logic processor (#0) $200_0$. An IP packet transmitted as an optical signal through optical fiber transmission path (#1) $601_1$ is converted by photoelectric transducer circuit (#1) $320_1$ of physical processor (#1) $300_1$ into an electric signal, which is output from switching circuit (#1) $310_1$ to logic processor (#1) $200_1$.

In the example shown in FIG. 2, the layer 2 switch switching circuit is set to the active-backup system configuration by process setting switch 700, and is connected to optical fiber transmission path (#0) $601_0$ only which serves as an active system link. In the present example, an IP packet transmitted as an optical signal through optical fiber transmission path (#0) $601_0$ is converted by photoelectric transducer circuit (#0) $320_0$ of physical processor (#0) $300_0$ into an electric signal, which is distributed from switching circuit (#0) $310_0$ to logic processor (#0) $200_0$ and logic processor (#1) $200_1$. Since either one of logic processor (#0) $200_0$ and logic processor (#1) $200_1$ is necessarily in the active state and the other in the standby state in the active-backup system configuration, duplicated IP packets will not be delivered to a corresponding card.

Switch managing circuits (#0, #1) $220_0$, $220_1$ of logic processors (#0, #1) $200_0$, $200_1$ and switching circuits (#0, #1) $310_0$, $310_1$ of physical processors (#0, #1) $300_0$, $300_1$ will be described in detail below.

First, switch managing circuits (#0, #1) $220_0$, $220_1$ will be described below with reference to FIG. 4.

Figure 4:
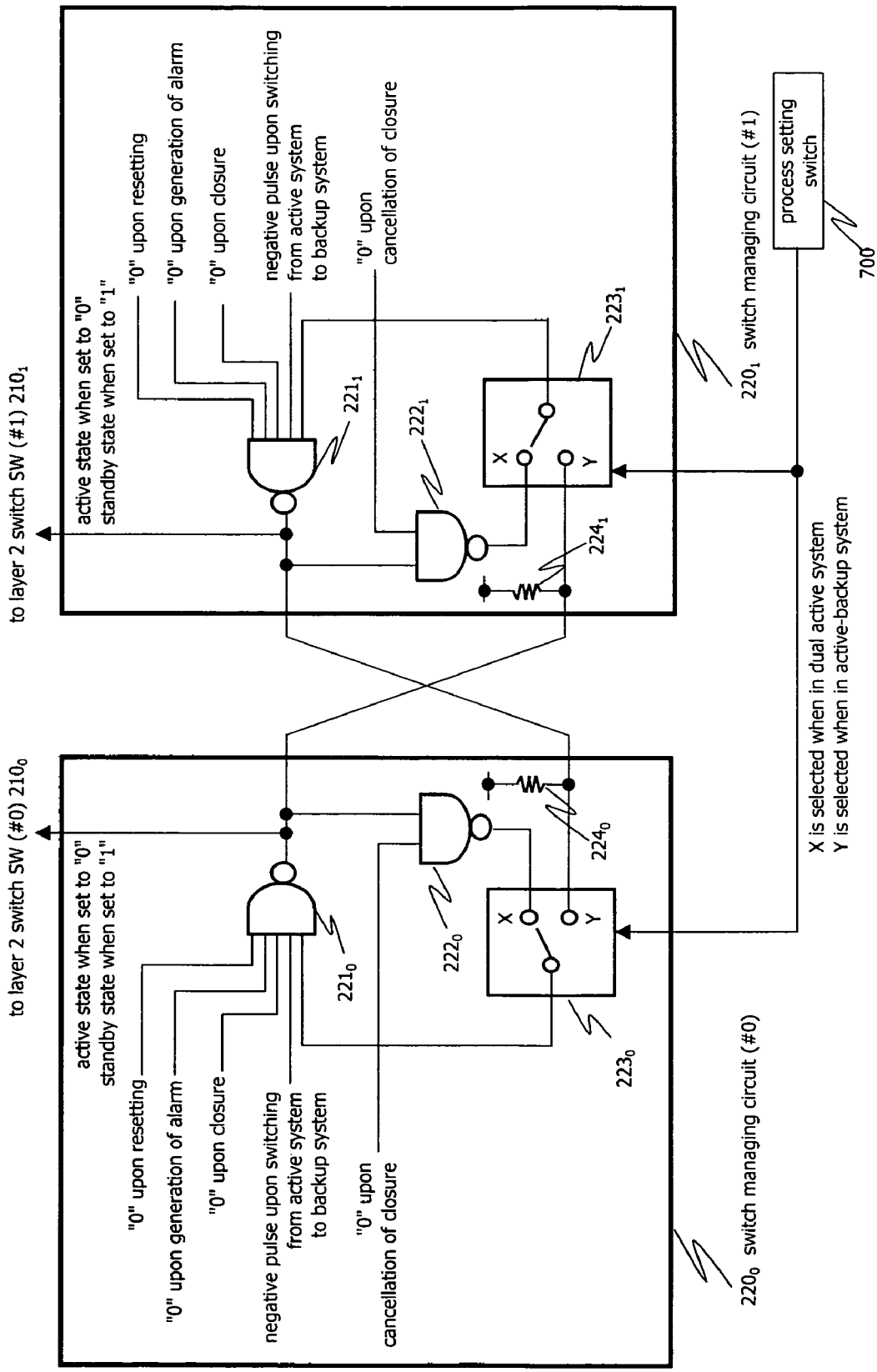
FIG. 4 is a block diagram of switch managing circuits shown in FIGS. 1 and 2.

As shown in FIG. 4, switch managing circuit (#0) $220_0$ has NAND gate $221_0$, NAND gate $222_0$, selector $223_0$, and pull-up resistor $224_0$.

NAND gate $221_0$ has an output terminal connected to switch managing circuit (#1) $220_1$ of logic processor (#1) $200_1$. NAND gate $221_0$ has input terminals for being supplied with a reset signal which indicates resetting when it is of logic "0", an alarm signal which indicates the generation of an alarm when it is of logic "0", a closure signal which indicates a closure state when it is of logic "0", a pulse signal which represents a negative pulse when logic processor (#0) $200_0$ is switched from the active system to the backup system, and an output signal from selector $223_0$. NAND gate $221_0$ applies an output signal as a state instruction signal, which represents the active state when it is "0" and the standby state when it is "1", also to layer 2 switch SW (#0) $210_0$.

Selector $223_0$ is a circuit for selecting a signal from input terminal X or a signal from input terminal Y based on a signal from process setting switch 700. Specifically, selector $223_0$ selects the signal from input terminal X when process setting switch 700 sets the layer 2 switch switching circuit to the dual active system configuration, and selects the signal from input terminal Y when process setting switch 700 sets the layer 2 switch switching circuit to the active-backup system configuration.

NAND gate $222_0$ has input terminals for being supplied with the output signal from NAND gate $221_0$ and a closure canceling signal which indicates the cancellation of the closure state when it is of logic "0". NAND gate $222_0$ has an output terminal connected to input terminal X of selector $223_0$. Input terminal Y of selector $223_0$ is connected to the output terminal of NAND gate $221_1$ of switch managing circuit (#1) $220_1$. Pull-up resistor $224_0$ is connected to input terminal Y of selector $223_0$.

The alarm signal input to NAND gate $221_0$ is generated by an alarm detecting circuit (not shown) in the layer 2 switch switching circuit. The reset signal, the closure signal, and the pulse signal that are input to NAND gate $221_0$, and the closure canceling signal input to NAND gate $222_0$ are signals that are generated when the user manually operates switches (not shown). For example, the user places logic processor (#0) $200_0$ into the closure state when logic processor (#0) $200_0$ is to be serviced for maintenance.

Similarly, switch managing circuit (#0) $220_1$ has NAND gate $221_1$, NAND gate $222_1$, selector $223_1$, and pull-up resistor $224_1$.

NAND gate $221_1$ has an output terminal connected to switch managing circuit (#0) $220_0$ of logic processor (#0) $200_0$. NAND gate $221_1$ has input terminals for being supplied with a reset signal which indicates resetting when it is of logic "0", an alarm signal which indicates the generation of an alarm when it is of logic "0", a closure signal which indicates a closure state when it is of logic "0", a pulse signal which represents a negative pulse when logic processor (#1) $200_1$ is switched from the active system to the backup system, and an output signal from selector $223_1$. NAND gate $221_1$ applies an output signal as a state instruction signal, which represents the active state when it is "0" and the standby state when it is "1", also to layer 2 switch SW (#1) $210_1$.

Selector $223_1$ is a circuit for selecting a signal from input terminal X or a signal from input terminal Y based on a signal from process setting switch 700. Specifically, selector $223_1$ selects the signal from input terminal X when process setting switch 700 sets the layer 2 switch switching circuit to the dual active system configuration, and selects the signal from input terminal Y when process setting switch 700 sets the layer 2 switch switching circuit to the active-backup system configuration.

NAND gate $222_1$ has input terminals for being supplied with the output signal from NAND gate $221_1$ and a closure canceling signal which indicates the cancellation of the closure state when it is of logic "0". NAND gate $222_1$ has an output terminal connected to input terminal X of selector $223_1$. Input terminal Y of selector $223_1$ is connected to the output terminal of NAND gate $221_0$ of switch managing circuit (#0) $220_0$. Pull-up resistor $224_1$ is connected to input terminal Y of selector $223_1$.

The alarm signal input to NAND gate $221_1$ is generated by an alarm detecting circuit (not shown) in the layer 2 switch switching circuit. The reset signal, the closure signal, and the pulse signal that are input to NAND gate $221_1$, and the closure canceling signal input to NAND gate $222_1$ are signals that are generated when the user manually operates switches (not shown). For example, the user places logic processor (#1) $200_1$ into the closure state when logic processor (#1) $200$ is to be serviced for maintenance.

Switching circuits (#0, #1) $310_0$, $310_1$ will be described below with reference to FIG. 5.

Figure 5:
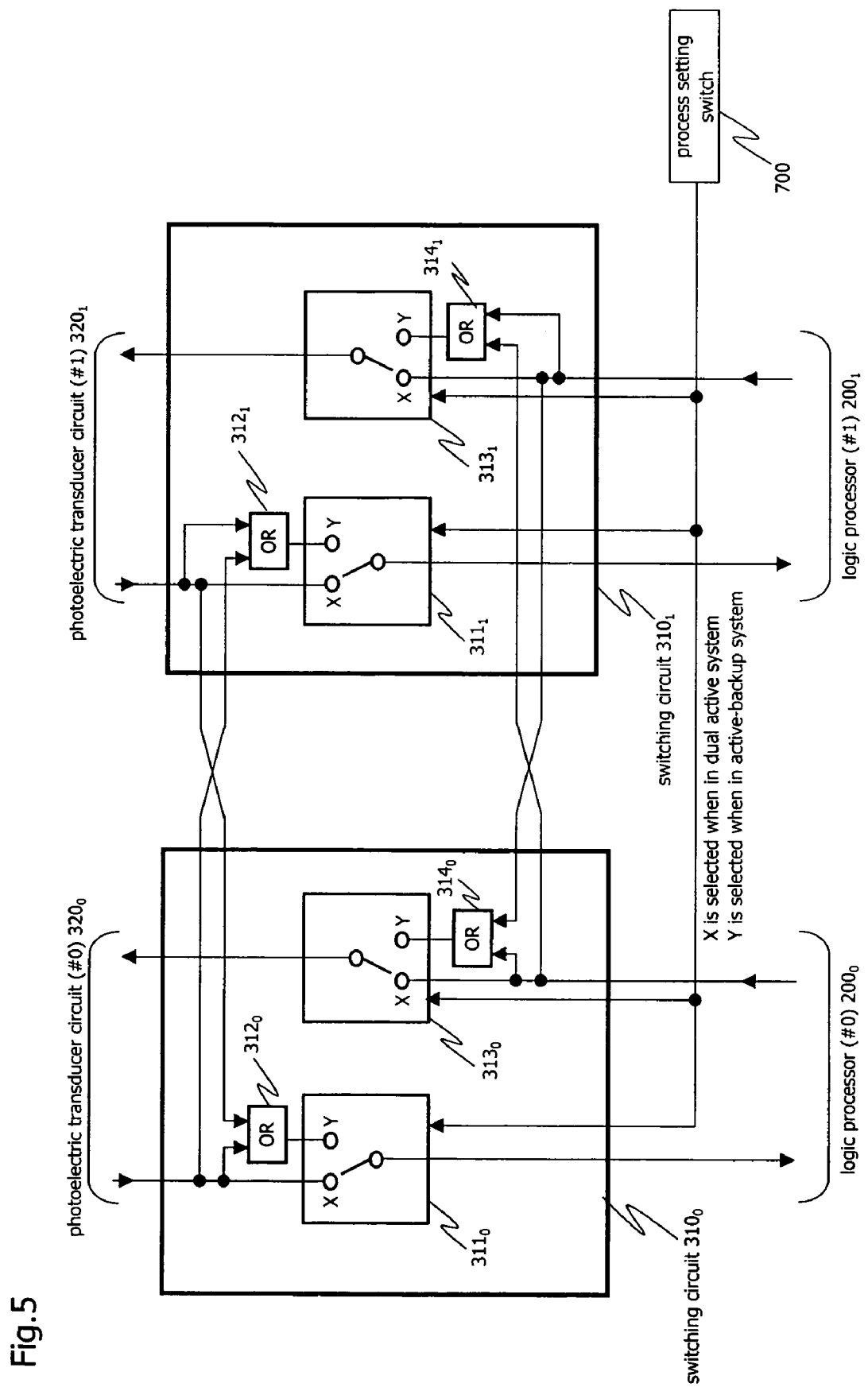
FIG. 5 is a block diagram of switching circuits shown in FIGS. 1 and 2.

As shown in FIG. 5, switching circuit (#0) $310_0$ has selector $311_0$, OR circuit $312_0$, selector $313_0$, and OR circuit $314_0$.

Input terminal of selector $311_0$ is supplied with an IP packet from photoelectric transducer circuit (#0) $320_0$. Selector $311_0$ has two input terminals, i.e., input terminal X and input terminal Y. Based on a signal from processing setting switch 700, selector $311_0$ selects either one of signals from input terminal X and input terminal Y. Specifically, selector $311_0$ selects the signal from input terminal X when process setting switch 700 sets the layer 2 switch switching circuit to the dual active system configuration, and selects the signal from input terminal Y when process setting switch 700 sets the layer 2 switch switching circuit to the active-backup system configuration. Selector $311_0$ transfers an IP packet input through input terminal X or input terminal Y to logic processor (#0) $200_0$. An IP packet from logic processor (#0) $200_0$ is input to input terminal X of selector $313_0$. Selector $313_0$ has two input terminals, i.e., input terminal X and input terminal Y. Based on a signal from processing setting switch 700, selector $313_0$ selects either one of signals from input terminal X and input terminal Y. Specifically, selector $313_0$ selects the signal from input terminal X when process setting switch 700 sets the layer 2 switch switching circuit to the dual active system configuration, and selects the signal from input terminal Y when process setting switch 700 sets the layer 2 switch switching circuit to the active-backup system configuration. Selector $313_0$ transfers an IP packet input through input terminal X or input terminal Y to photoelectric transducer circuit (#0) $320_0$.

OR circuit $312_0$ ORs an IP packet signal from photoelectric transducer circuit (#0) $320_0$ and an IP packet signal from photoelectric transducer circuit (#1) $320_1$, and inputs a resultant output signal to input terminal Y of selector $311_0$. OR circuit $314_0$ ORs an IP packet signal from logic processor (#0) $200_0$ and an IP packet signal from logic processor (#1) $200_1$, and inputs a resultant output signal to input terminal Y of selector $313_0$.

Likewise, switching circuit (#1) $310_1$ has selector $311_1$, OR circuit $312_1$, selector $313_1$, and OR circuit $314_1$.

An IP packet from photoelectric transducer circuit (#1) $320_1$ is supplied to input terminal X of selector $311_1$ of switching circuit (#1) $310_1$. Selector $311_1$ has two input terminals, i.e., input terminal X and input terminal Y. Based on a signal from processing setting switch 700, selector $311_1$ selects either one of signals from input terminal X and input terminal Y. Specifically, selector $311_1$ selects the signal from input terminal X when process setting switch 700 sets the layer 2 switch switching circuit to the dual active system configuration, and selects the signal from input terminal Y when process setting switch 700 sets the layer 2 switch switching circuit to the active-backup system configuration. Selector $311_1$ transfers an IP packet input through input terminal X or input terminal Y to logic processor (#1) $200_1$. An IP packet from logic processor (#1) $200_1$ is input to input terminal X of selector $313_1$. Selector $313_1$ has two input terminals, i.e., input terminal X and input terminal Y. Based on a signal from processing setting switch 700, selector $313_1$ selects either one of signals from input terminal X and input terminal Y. Specifically, selector $313_1$ selects the signal from input terminal X when process setting switch 700 sets the layer 2 switch switching circuit to the dual active system configuration, and selects the signal from input terminal Y when process setting switch 700 sets the layer 2 switch switching circuit to the active-backup system configuration. Selector $313_1$ transfers an IP packet input through input terminal X or input terminal Y to photoelectric transducer circuit (#1) $320_1$.

OR circuit $312_1$ ORs an IP packet signal from photoelectric transducer circuit (#0) $320_0$ and an IP packet signal from photoelectric transducer circuit (#1) $320_1$, and inputs a resultant output signal to input terminal Y of selector $311_1$. OR circuit $314_1$ ORs an IP packet signal from logic processor (#0) $200_0$ and an IP packet signal from logic processor (#1) $200_1$, and inputs a resultant output signal to input terminal Y of selector $313_1$.

Operation of the layer 2 switch switching circuit according to the present embodiment will be described below. Specifically, operation of the layer 2 switch switching circuit as it is incorporated in the dual active system, and operation of the layer 2 switch switching circuit as it is incorporated in the active-backup system will be described below.

(A) Operation of the Layer 2 Switch Switching Circuit as it is incorporated in the Dual Active System:

Operation of Switch Managing Circuits (#0, #1) $220_0$, $220_1$:

Operation of switch managing circuits (#0, #1) $220_0$, $220_1$ when the layer 2 switch switching circuit is incorporated in the dual active system will be described below with reference to FIGS. 1 and 4.

Selector $223_0$ of switch managing circuit (#0) $220_0$ and selector $223_1$ of switch managing circuit (#1) $220_1$ select respective input terminals X when process setting switch 700 sets the layer 2 switch switching circuit to the dual active system configuration. Since signals that have connected switch managing circuit $220_0$ and switch managing circuit $220_1$ to each other are no longer applied, switch managing circuit $220_0$ and switch managing circuit $220_1$ are independent of each other.

In switch managing circuit $220_0$, the output signal from NAND gate $221_0$ is delivered through NAND gate $222_0$ back to an input terminal of NAND gate $221_0$. Therefore, NAND gate $221_0$ and NAND gate $222_0$ jointly make up a flip-flop. The output signal from NAND gate $221_0$ is initially of logic "0", putting layer 2 switch SW (#0) $210_0$ into the active state. In this state, it is assumed that either one of the input signals applied to NAND gate $221_0$ is of logic "0" when the reset signal is set to logic "0" by the user, or the alarm signal is set to logic "0" by the generation of an alarm, or the closure signal is set to logic "0" by the closure state set by the user. Since the output signal from NAND gate $221_0$ becomes logic "1", layer 2 switch SW (#0) $210_0$ changes to the standby state. If the closure state is canceled by the user to set the closure canceling signal to logic "0", the flip-flop changes from one state to the other, setting the output signal from NAND gate $221_0$ to logic "0", so that layer 2 switch SW (#0) $210_0$ changes to the active state. According to the dual active system configuration, the pulse signal which goes negative upon switching from the active system to the backup system is not employed, but the closure signal or the closure canceling signal is manually controlled to change layer 2 switch SW (#0) $210_0$ to the active state or the standby state. When an alarm is generated, since logic level "0" of the alarm signal is input to the corresponding input terminal of NAND gate $221_0$, layer 2 switch SW (#0) $210_0$ automatically changes to the standby state.

Similarly, in switch managing circuit $220_1$, the output signal from NAND gate $221_1$ is delivered through NAND gate $222_1$ back to an input terminal of NAND gate $221_1$. Therefore, NAND gate $221_1$ and NAND gate $222_1$ jointly make up a flip-flop. The output signal from NAND gate $221_1$ is initially of logic "0", putting layer 2 switch SW (#1) $210_1$ into the active state. In this state, it is assumed that either one of the input signals applied to NAND gate $221_1$ is of logic "0" when the reset signal is set to logic "0" by the user, or the alarm signal is set to logic "0" by the generation of an alarm, or the closure signal is set to logic "0" by the closure state set by the user. Since the output signal from NAND gate $221_1$ becomes logic "1", layer 2 switch SW (#1) $210_1$ changes to the standby state. If the closure state is canceled by the user to set the closure sure canceling signal to logic "0", the flip-flop changes from one state to the other, setting the output signal from NAND gate $221_1$ to logic "0", so that layer 2 switch SW (#1) $210_1$ changes to the active state. According to the dual active system configuration, the pulse signal which goes negative upon switching from the active system to the backup system is not employed, but the closure signal or the closure canceling signal is manually controlled to change layer 2 switch SW (#1) $210_1$ to the active state or the standby state. When an alarm is generated, since logic level "0" of the alarm signal is input to the corresponding input terminal of NAND gate $221_1$, layer 2 switch SW (#1) $210_1$ automatically changes to the standby state.

Operation of Switching Circuits (#0, #1) $310_0$, $310_1$:

Operation of switching circuits (#0, #1) $310_0$, $310_1$ when the layer 2 switch switching circuit is incorporated in the dual active system will be described below with reference to FIGS. 1 and 5.

Selectors $311_0$, $313_0$ of switching circuit (#0) $310_0$ and selectors $311_1$, $313_1$ of switching circuit (#1) $310_1$ select respective input terminals X when process setting switch 700 sets the layer 2 switch switching circuit to the dual active system configuration.

In switching circuit (#0) $310_0$, an IP packet from photoelectric transducer circuit (#0) $320_0$ passes through selector $311_0$ and is output to logic processor (#0) $200_0$, and an IP packet from logic processor (#0) $200_0$ passes through selector $313_0$ and is output to photoelectric transducer circuit (#0) $320_0$.

Similarly, in switching circuit (#1) $310_1$, an IP packet from photoelectric transducer circuit (#1) $320_1$ passes through selector $311_1$ and is output to logic processor (#1) $200_1$, and an IP packet from logic processor (#1) $200_1$ passes through selector $313_1$ and is output to photoelectric transducer circuit (#1) $320_1$.

Thus, logic processor (#0) $200_0$ is connected to physical processor (#0) $300_0$ and operates in the active system, and logic processor (#1) $200_1$ is connected to physical processor (#1) $300_1$ and operates in the active system. Therefore, the layer 2 switch switching circuit operates in the dual active system.

Figure 6:
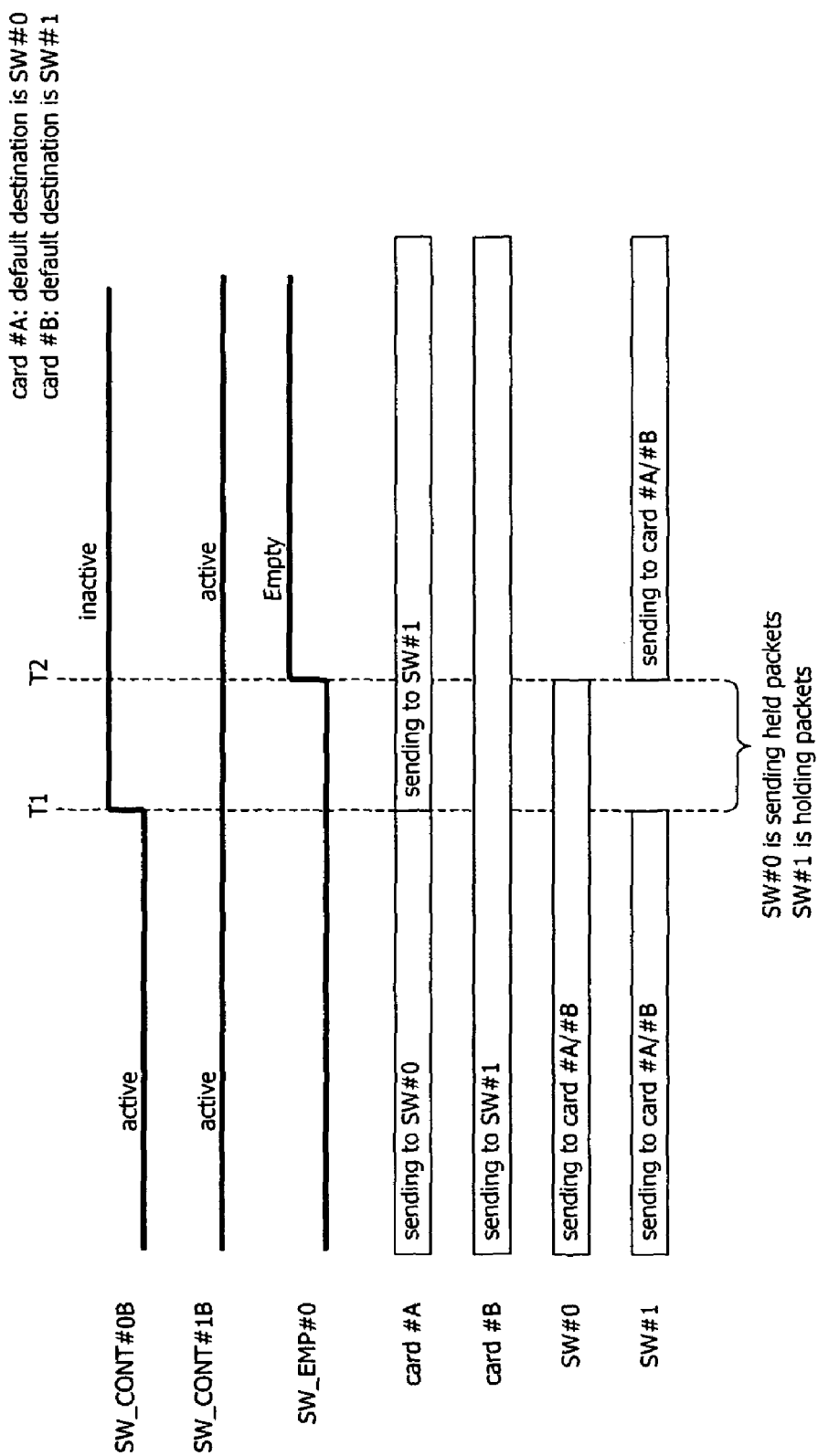
FIG. 6 is a timing chart of an operation sequence of the layer 2 switch switching circuit according to the embodiment of the present invention as it is incorporated in the dual active system.

Operation of Layer 2 Switches SW (#0, #1) $210_0$, $210_1$ and cards (#A Through #C) $100_A$ Through $100_C$:

Operation of layer 2 switches SW (#0, #1) $210_0$, $210_1$ and cards (#A through #C) $100_A$ through $100_C$ when the layer 2 switch switching circuit is incorporated in the dual active system will be described below with reference to FIGS. 1, 3, and 6. For the sake of brevity, only operation of cards (#A, #B) $100_A$, $100_B$ will be described below.

Both layer 2 switches SW (#0, #1) $210_0$, $210_1$ are in the active state (ACT), and signals on both signal line SW_CONT#0B $501_0$ and signal line SW_CONT#1B $501_1$ are active. The signals on signal line SW_CONT#0B $501_0$ and signal line SW_CONT#1B $501_1$ are active when they are of logic "0" and inactive when they are of logic "1".

It is assumed that an alarm is generated due to a fault or the closure state is set by the user in either one of logic processor (#0) $200_0$ and logic processor (#1) $200_1$. In the logic processor wherein the fault occurs or the closure state is set, the switch managing circuit generates a state instruction signal representing the standby state, placing the layer 2 switch into the standby state (STBY). Specifically, one of layer 2 switches SW (#0, #1) $210_0$, $210_1$ is in the standby state (STBY) and the other in the active state (ACT), so that all IP packets will pass through only the layer 2 switch in the active state (ACT).

Operation of the layer 2 switch switching circuit upon a transition from the active state of both layer 2 switches SW (#0, #1) $210_0$, $210_1$ to the standby state of only layer 2 switch SW (#0) $210_0$ will be described below. It is assumed that when both layer 2 switches SW (#0, #1) $210_0$, $210_1$ are in the active state (ACT), i.e., both state signal delivery unit $213_0$ and state signal delivery unit $213_1$ are delivering active signals to signal line SW_CONT#0B $501_0$ and signal line SW_CONT#1B $501_1$, operational conditions are as follows: In order to distribute loads of IP packets, the destination of IP packets from each of cards (#A, #B) $100_A$, $100_B$ is determined by default as either one of layer 2 switches SW (#0, #1) $210_0$, $210_1$. Card controller 101 of each of cards (#A, #B) $100_A$, $100_B$ sends IP packets to the default destination. For example, a card that is positioned as an even-numbered card from the left (or right) has layer 2 switch SW (#0) $210_0$ as the destination of IP packets, and a card that is positioned as an odd-numbered card from the left (or right) has layer 2 switch SW (#1) $210_1$ as the destination of IP packets. When layer 2 switch SW (#0) $210_0$ is in the standby state and layer 2 switch SW (#1) $210_1$ is in the active state, card controller 101 of each of cards (#A, #B) $100_A$, $100_B$ unconditionally sends IP packets to layer 2 switch SW (#1) $210_1$.

Operation of the layer 2 switch switching circuit if only layer 2 switch SW (#0) $210_0$ is switched to the standby state when both layer 2 switch SW (#0) $210_0$ and layer 2 switch SW (#1) $210_1$ have been in the active state in the dual active system configuration will be described below with reference to the timing chart shown in FIG. 6.

Prior to time T1, both layer 2 switch SW (#0) $210_0$ and layer 2 switch SW (#1) $210_1$ are in the active state (ACT). Therefore, both state signal delivery unit $213_0$ and state signal delivery unit $213_1$ are delivering active signals to signal line SW_CONT#0B $501_0$ and signal line SW_CONT#1B $501_1$. Buffer state signal delivery unit $214_0$ is delivering a signal indicating that internal buffer $212_0$ of layer 2 switch SW (#0) $210_0$ is holding IP packets to signal line SW_EMP#0B $502_0$. At this time, the signal on signal line SW_EMP#0B $502_0$ is of logic "0". Card controller 101 of card (#A) $100_A$ is sending IP packets to layer 2 switch SW (#0) $210_0$ which is the default destination, and card controller 101 of card (#B) $100_B$ is sending IP packets to layer 2 switch SW (#1) $210_1$ which is the default destination. Switch controller $211_0$ of layer 2 switch SW (#0) $210_0$ and switch controller $211_1$ of layer 2 switch SW (#1) $210_1$ are sending IP packets to a corresponding one of card (#A) $100_A$ and card (#B) $100_B$.

When the user sets logic processor (#0) $200_0$ to the closure state at time T1, a state instruction signal indicative of a transition to the standby state is input from switch managing circuit (#0) $220_0$ to layer 2 switch SW (#0) $210_0$. Then, state signal delivery unit $213_0$ of layer 2 switch SW (#0) $210_0$ immediately makes the signal on signal line SW_CONT#0B $501_0$ inactive.

Between time T1 and time T2, in response to the inactive signal on signal line SW_CONT#0B $501_0$, card controller 101 of card (#A) $100_A$ monitors signal line SW_CONT#1B $501_1$. Since the signal on signal line SW_CONT#1B $501_1$ is active, card controller 101 of card (#A) $100_A$ sends IP packets to layer 2 switch SW (#1) $210_1$. Card controller 101 of card (#B) $100_B$ continuously sends IP packets to layer 2 switch SW (#1) $210_1$.

Switch controller $211_0$ of layer 2 switch SW (#0) $210_0$ continuously sends IP packets held by internal buffer $212_0$ until it completes the transmission of all the IP packets held by internal buffer $212_0$. When switch controller $211_1$ of layer 2 switch SW (#1) $210_1$ detects the transition of layer 2 switch SW (#0) $210_0$ to the standby state based on the state signal on signal line SW_CONT#0B $501_0$, switch controller $211_1$ accepts IP packets from card (#A) $100_A$ and card (#B) $100_B$ and holds them in internal buffer $212_1$, but stops sending IP packets to card (#A) $100_A$ and card (#B) $100_B$. Switch controller $211_1$ of layer 2 switch SW (#1) $210_1$ monitors signal line SW_EMP#0B $502_0$, and waits until the transmission of all the IP packets held by internal buffer $212_0$ of layer 2 switch SW (#0) $210_0$ is completed and internal buffer $212_0$ becomes empty. When internal buffer $212_0$ of layer 2 switch SW (#0) $210_0$ is empty, the signal on signal line SW_EMP#0B $502_0$ becomes logic "1".

When internal buffer $212_0$ of layer 2 switch SW (#0) $210_0$ becomes empty at time T2, switch controller $211_1$ of layer 2 switch SW (#1) $210_1$ resumes sending IP packets held by internal buffer $212_1$. At this time, layer 2 switch SW (#0) $210_0$ completely changes to the standby state (STBY).

(B) Operation of the Layer 2 Switch Switching Circuit as it is Incorporated in the Active-Dual System:

Operation of Switch Managing Circuits (#0, #1) $220_0$, $220_1$:

Operation of switch managing circuits (#0, #1) $220_0$, $220_1$ when the layer 2 switch switching circuit is incorporated in the active-backup system will be described below with reference to FIGS. 2 and 4.

Selector $223_0$ of switch managing circuit (#0) $220_0$ and selector $223_1$ of switch managing circuit (#1) $220_1$ select respective input terminals Y when process setting switch 700 sets the layer 2 switch switching circuit to the active-backup system configuration.

The output signal from NAND gate $221_0$ is input through selector $223_1$ to NAND gate $221_1$, and the output signal from NAND gate $221_1$ is input through selector $223_0$ to NAND gate $221_0$. Therefore, NAND gate $221_0$ and NAND gate $221_1$ jointly make up a flip-flop. Since the output signal from NAND gate $221_0$ and the output signal from NAND gate $221_1$ correspond to output signals of the flip-flop, when one of the output signals is of logic "1", the other output signal is of logic "0". Consequently, the output signal from NAND gate $221_0$ and the output signal from NAND gate $221_1$ can be used as a switching signal for switching between the active system and the backup system.

If switch managing circuit (#0) $220_0$ is in the active state in the active system configuration, the output signal from NAND gate $221_0$ is of logic "0" and the output signal from NAND gate $221_1$ is of logic "1", putting switch managing circuit (#1) $220_1$ in the standby state. In this state, when an alarm is generated in switch managing circuit (#0) $220_0$, one of the input signals of NAND gate $221_0$ becomes logic "0", and the output signal of NAND gate $221_0$ becomes logic "1". As all the input signals of NAND gate $221_1$ become logic "1", the output signal of NAND gate $221_1$ becomes logic "0, returning logic "0" to NAND gate $221_0$. Therefore, the output signal of NAND gate $221_0$ is fixed to logic "1". Switch managing circuit (#0) $220_0$ wherein the alarm is generated changes from the active state to the standby state, and switch managing circuit (#1) $220_1$ changes from the standby state to the active state.

If either one of logic processors (#0, #1) $200_0$, $200_1$ as highway cards is pulled out, the switch managing circuit of the remaining logic processor is automatically put into the active state. Specifically, it is assumed that logic processor (#0) $200_0$ is pulled out when switch managing circuit (#0) $220_0$ is in the active state and switch managing circuit (#1) $220_1$ is in the standby state. Though input terminal Y of selector $223_1$ of switch managing circuit (#1) $220_1$ becomes open, a signal of logic "1" is applied to input terminal Y by pull-up resistor $224_1$. Since the signal of logic "1" is applied to NAND gate $221_1$, the output signal of NAND gate $221_1$ becomes logic "0", changing switch managing circuit (#1) $220_1$ from the standby state to the active state.

For manually switching switch managing circuits (#0, #1) $220_0$, $220_1$ between the active system and the backup system, a negative pulse is input to an input terminal of NAND gate $221_0$ or NAND gate $221_1$. It is assumed that a negative pulse is input to an input terminal of NAND gate $221_0$ when switch managing circuit (#0) $220_0$ is in the active state and switch managing circuit (#1) $220_1$ is in the standby state. The output signal of NAND gate $221_0$ temporarily becomes logic "1", applying an input signal which is temporarily of logic "1" to NAND gate $221_1$ through selector $223_1$. The output signal of NAND gate $221_1$ temporarily becomes logic "0" and is returned through selector $223_0$ to the input terminal of NAND gate $221_0$. Therefore, the output signal of NAND gate $221_0$ is fixed to logic "1". Switch managing circuit (#0) $220_0$ changes from the active state to the standby state, and switch managing circuit (#1) $220_1$ changes from the standby state to the active state.

Operation of Switching Circuits (#0, #1) $310_0$, $310_1$:

Operation of switching circuits (#0, #1) $310_0$, $310_1$ when the layer 2 switch switching circuit is incorporated in the active-backup system will be described below with reference to FIGS. 2 and 5.

Selectors $311_0$, $313_0$ of switching circuit (#0) $310_0$ and selectors $311_1$, $313_1$ of switching circuit (#1) $310_1$ select respective input terminals Y when process setting switch 700 sets the layer 2 switch switching circuit to the active-backup system configuration.

In switching circuit (#0) $310_0$, OR circuit $312_0$ ORs an IP packet signal from photoelectric transducer circuit (#0) $320_0$ and an IP packet signal from photoelectric transducer circuit (#1) $320_1$, and inputs a resultant IP packet signal to logic processor (#0) $200_0$.

In the active-backup system configuration, since an optical fiber transmission path is connected to only one of photoelectric transducer circuit (#0) $320_0$ and photoelectric transducer circuit (#1) $320_1$, either one of the IP packet signal from photoelectric transducer circuit (#0) $320_0$ and the IP packet signal from photoelectric transducer circuit (#1) $320_1$ is fixed to logic "0". Therefore, when the IP packet signal from photoelectric transducer circuit (#0) $320_0$ and the IP packet signal from photoelectric transducer circuit (#1) $320_1$ pass through OR circuit $312_0$, only an effective IP packet signal is input to input terminal Y of selector $311_0$. Thus, OR circuit $312_0$ performs a function to select an effective IP packet signal out of the IP packet signal from photoelectric transducer circuit (#0) $320_0$ and the IP packet signal from photoelectric transducer circuit (#1) $320_1$.

In switching circuit (#0) $310_0$, OR circuit $314_0$ ORs an IP packet signal from logic processor (#0) $200_0$ and an IP packet signal from logic processor (#1) $200_1$, and inputs a resultant IP packet signal to photoelectric transducer circuit (#0) $320_0$.

In the active-backup system configuration, either one of the IP packet signal from logic processor (#0) $200_0$ and the IP packet signal from logic processor (#1) $200_1$ is fixed to logic "0". Therefore, OR circuit $314_0$ performs a function to select an effective IP packet signal out of the IP packet signal from logic processor (#0) $200_0$ and the IP packet signal from logic processor (#1) $200_1$.

Similarly, in switching circuit (#0) $310_1$, OR circuit $312_1$ ORs an IP packet signal from photoelectric transducer circuit (#0) $320_0$ and an IP packet signal from photoelectric transducer circuit (#1) $320_1$, and inputs a resultant IP packet signal to logic processor (#1) $200_1$.

In the active-backup system configuration, either one of the IP packet signal from photoelectric transducer circuit (#0) $320_0$ and the IP packet signal from photoelectric transducer circuit (#1) $320_1$ is fixed to logic "0", as described above. Therefore, OR circuit $312_1$ performs a function to select an effective IP packet signal out of the IP packet signal from photoelectric transducer circuit (#0) $320_0$ and the IP packet signal from photoelectric transducer circuit (#1) $320_1$.

In switching circuit (#1) $310_1$, OR circuit $314_1$ ORs an IP packet signal from logic processor (#0) $200_0$ and an IP packet signal from logic processor (#1) $200_1$, and inputs a resultant IP packet signal to photoelectric transducer circuit (#1) $320_1$.

In the active-backup system configuration, either one of the IP packet signal from logic processor (#0) $200_0$ and the IP packet signal from logic processor (#1) $200_1$ is fixed to logic "0". Therefore, OR circuit $314_1$ performs a function to select an effective IP packet signal out of the IP packet signal from logic processor (#0) $200_0$ and the IP packet signal from logic processor (#1) $200_1$.

The IP packet signal from either one of photoelectric transducer circuit (#0) $320_0$ and photoelectric transducer circuit (#1) $320_1$ is transmitted to both logic processor (#0) $200_0$ and logic processor (#1) $200_1$, and the IP packet signal from either one of logic processor (#0) $200_0$ and logic processor (#1) $200_1$ is transmitted to both photoelectric transducer circuit (#0) $320_0$ and photoelectric transducer circuit (#1) $320_1$. Therefore, even though an optical fiber transmission path is connected to either one of photoelectric transducer circuit (#0) $320_0$ and photoelectric transducer circuit (#1) $320_1$, an IP packet from the optical fiber transmission path is transmitted to both logic processor (#0) $200_0$ and logic processor (#1) $200_1$, and IP packet signals from logic processor (#0) $200_0$ and logic processor (#1) $200_1$ are transmitted to the optical fiber transmission path.

Figure 7:
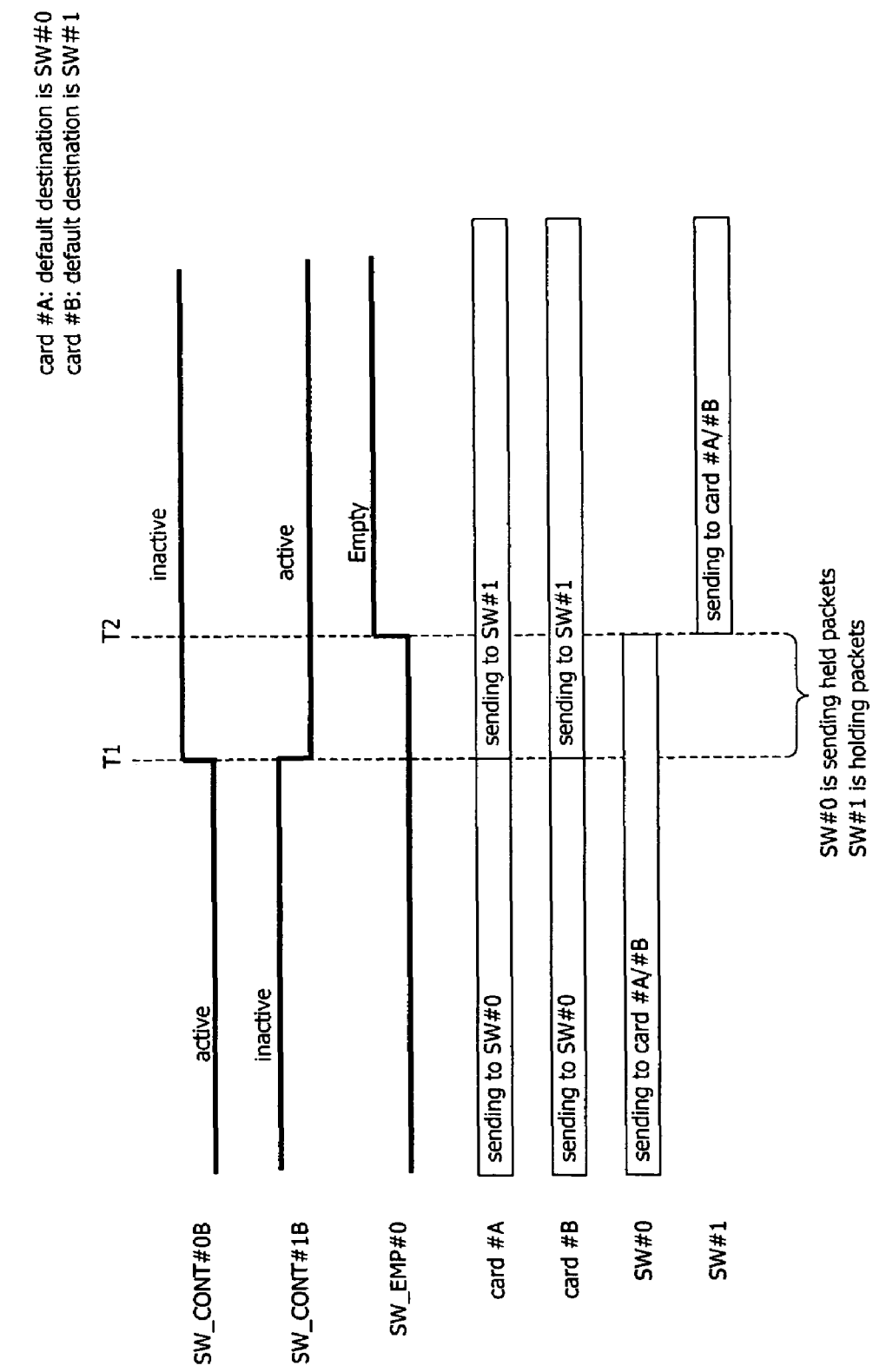
FIG. 7 is a timing chart of an operation sequence of the layer 2 switch switching circuit according to the embodiment of the present invention as it is incorporated in the active-backup system.

Operation of Layer 2 Switches SW (#0, #1) $210_0$, $210_1$ and cards (#A Through #C) $100_A$ Through $100_C$:

Operation of layer 2 switches SW (#0, #1) $210_0$, $210_1$ and cards (#A through #C) $100_A$ through $100_C$ when the layer 2 switch switching circuit is incorporated in the active-backup system will be described below with reference to FIGS. 2, 3, and 7. For the sake of brevity, only operation of cards (#A, #B) $100_A$, $100_B$ will be described below.

One of layer 2 switches SW (#0, #1) $210_0$, $210_1$ is in the active state (ACT), and the other in the standby state (STBY) state. One of the signals on signal line SW_CONT#0B $501_0$ and signal line SW_CONT#1B $501_1$ is active, and the other inactive.

Operation of the layer 2 switch switching circuit for switching between the active system and the backup system due to a fault of layer 2 switch SW (#0) $210_0$ when layer 2 switch SW (#0) $210_0$ is in the active state and layer 2 switch SW (#1) $210_1$ is in the standby state will be described below. It is assumed that transmitting conditions of signal line SW_CONT#0B $501_0$ and signal line SW_CONT#1B $501_1$, card (#A) $100_A$, and card (#B) $100_B$ are the same as those of the dual active system configuration.

Operation of the layer 2 switch switching circuit for switching between the active system and the backup system when layer 2 switch SW (#0) $210_0$ is in the active state and layer 2 switch SW (#1) $210_1$ is in the standby state will be described below with reference to the timing chart shown in FIG. 7.

Prior to time T1, layer 2 switch SW (#0) $210_0$ is in the active state (ACT) and layer 2 switch SW (#1) $210_1$ is in the standby state (STBY). Therefore, state signal delivery unit $213_0$ is delivering an active signal to signal line SW_CONT#0B $501_0$, and state signal delivery unit $213_1$ is delivering an inactive signal to signal line SW_CONT#1B $501_1$. Buffer state signal delivery unit $214_0$ is delivering a signal indicating that internal buffer $212_0$ of layer 2 switch SW (#0) $210_0$ is holding IP packets to signal line SW_EMP#0B $502_0$. Both card controllers 101 of card (#A) $100_A$ and card (#B) $100_B$ are sending IP packets to layer 2 switch SW (#0) $210_0$. Switch controller $211_0$ of layer 2 switch SW (#0) $210_0$ is sending IP packets to a corresponding one of card (#A) $100_A$ and card (#B) $100_B$. Switch controller $211_1$ of layer 2 switch SW (#1) $210_1$ is not sending IP packets as layer 2 switch SW (#1) $210_1$ is in the standby state.

When the user sets logic processor (#0) $200_0$ to the closure state at time T1, a state instruction signal indicative of the standby state is input from switch managing circuit (#0) $220_0$ to layer 2 switch SW (#0) $210_0$. Then, state signal delivery unit $213_0$ of layer 2 switch SW (#0) $210_0$ immediately makes the signal on signal line SW_CONT#0B $501_0$ inactive. A state instruction signal indicative of the active state is input from switch managing circuit (#1) $220_1$ to layer 2 switch SW (#1) $210_1$. Then, state signal delivery unit $213_1$ of layer 2 switch SW (#1) $210_1$ immediately makes the signal on signal line SW_CONT#1B $501_1$ active.

Between time T1 and time T2, in response to the inactive signal on signal line SW_CONT#0B $501_0$, card controller 101 of each of card (#A) $100_A$ and card (#B) $100_B$ monitors signal line SW_CONT#1B $501_1$. Since the signal on signal line SW_CONT#1B $501_1$ is active, card controller 101 of each of card (#A) $100_A$ and card (#B) $100_B$ sends IP packets to layer 2 switch SW (#1) $210_1$.

Switch controller $211_0$ of layer 2 switch SW (#0) $210_0$ continuously sends IP packets held by internal buffer $212_0$ until it completes the transmission of all the IP packets held by internal buffer $212_0$. When switch controller $211_1$ of layer 2 switch SW (#1) $210_1$ detects the transition of layer 2 switch SW (#0) $210_0$ to the standby state based on the signal on signal line SW_CONT#0B $501_0$, switch controller $211_1$ accepts IP packets from card (#A) $100_A$ and card (#B) 100B and holds them in internal buffer $212_1$, but stops sending IP packets to card (#A) $100_A$ and card (#B) $100_B$. Switch controller $211_1$ of layer 2 switch SW (#1) $210_1$ monitors signal line SW_EMP#0B $502_0$, and waits until the transmission of all the IP packets held by internal buffer $212_0$ of layer 2 switch SW (#0) $210_0$ is completed and internal buffer $212_0$ becomes empty.

When internal buffer $212_0$ of layer 2 switch SW (#0) $210_0$ becomes empty at time T2, switch controller $211_1$ of layer 2 switch SW (#1) $210_1$ resumes sending IP packets held by internal buffer $212_1$. At this time, layer 2 switch SW (#0) $210_0$ completely changes to the standby state (STBY).

According to the present embodiment, as described above, cards (#A through #C) $100_A$ through $100_C$ monitor whether layer 2 switch SW (#0) $210_0$ and layer 2 switch SW (#1) $210_1$ are in the active state or the standby state, based on the state signals transmitted through signal line SW_CONT#0B $501_0$ and signal line SW_CONT#1B $501_1$, and switches the destination of IP packets to layer 2 switch SW (#0) $210_0$ or layer 2 switch SW (#1) $210_1$ depending on the monitored result.

Consequently, when both layer 2 switch SW (#0) $210_0$ and layer 2 switch SW (#1) $210_1$ are in the active state in the dual active system configuration, even if one of the layer 2 switches is put into the standby state, cards (#A through #C) $100_A$ through $100_C$ can automatically switch the destination of IP packets from the layer 2 switch that is put into the standby state to the layer 2 switch that is continuously in the active state. Therefore, the active state of both layer 2 switch SW (#0) $210_0$ and layer 2 switch SW (#1) $210_1$ can switch to the active state of one of layer 2 switch SW (#0) $210_0$ and layer 2 switch SW (#1) $210_1$.

Furthermore, when layer 2 switch SW (#0) $210_0$ and layer 2 switch SW (#1) $210_1$ are in the active-backup system configuration with one of them in the active state and the other in the standby state, if the layer 2 switch in the active system changes from the active state to the standby state, cards (#A through #C) $100_A$ through $100_C$ can automatically switch the destination of IP packets from the layer 2 switch that is in the active state to the layer 2 switch that is in the standby state. Therefore, layer 2 switch SW (#0) $210_0$ and layer 2 switch SW (#1) $210_1$ can switch between the active system and the backup system.

As described above, regardless of whether the redundant configuration is either the dual active system configuration or the active-backup system configuration, the destination of IP packets from cards (#A through #C) $100_A$ through $100_C$ can be switched without the need for a dedicated device which has heretofore been required. Since the destination of IP packets from cards (#A through #C) $100_A$ through $100_C$ can be switched in either the dual active system configuration or the active-backup system configuration, the layer 2 switch switching circuit according to the present invention is compatible with both the dual active system configuration and the active-backup system configuration.

According to the present embodiment, layer 2 switch SW (#0) $210_0$ and layer 2 switch SW (#1) $210_1$ monitor whether the companion layer 2 switch is in the active state or the standby state based on the signals transmitted through signal line SW_CONT#0B $501_0$ and signal line SW_CONT#1B $501_1$. If the layer 2 switch detects when the companion layer 2 switch changes from the active state to the standby state, the layer 2 switch stops sending IP packets. The layer 2 switch resumes sending IP packets when the transmission of all the IP packets held by the internal buffer of the companion layer 2 switch is completed.

Even when layer 2 switch SW (#0) $210_0$ and layer 2 switch SW (#1) $210_1$ detect when the companion layer 2 switch changes from the active state to the standby state, they wait until the transmission of all the IP packets held by the internal buffer of the companion layer 2 switch is completed. Therefore, it is possible to prevent a packet loss from occurring which would be caused if past IP packets remain in the companion layer 2 switch. As a packet loss is prevented from occurring, it is not necessary to send at all times replicas of IP packets from the layer 2 switch from which the destination of IP packets is to be switched to the layer 2 switch to which the destination of IP packets is to be switched, and hence a duplication of IP packets is avoided. Furthermore, because layer 2 switch SW (#0) $210_0$ and layer 2 switch SW (#1) $210_1$ resume sending IP packets after the transmission of all the IP packets held by the internal buffer of the companion layer 2 switch is completed, the sequence of IP packets sent to cards is prevented from being scrambled.

In the present embodiment, process setting switch 700 is installed as being independent of each of the cards. However, process setting switch 700 may be installed in each card. If process setting switch 700 is installed in some of the cards only, then those cards need to be installed under different conditions from the other cards. It is thus not preferable to install process setting switch 700 in some of the cards only from the standpoint of production of the cards. Based on the premise that the cards are identical in structure, two process setting switches 700 may be installed respectively in logic processor (#0) $200_0$ and logic processor (#1) $200_1$, and the output signals from process setting switches 700 may be wired-ORed to provide a single setting signal. In this case, two process setting switches 700 should have the same settings at all times.

In the present embodiment, when layer 2 switch SW (#0) $210_0$ changes from the active state to the standby state, packets held in layer 2 switch SW (#0) $210_0$ are distributed to the cards by layer 2 switch SW (#0) $210_0$ itself. However, packets held in layer 2 switch SW (#0) $210_0$ may be distributed to the cards by layer 2 switch SW (#1) $210_1$. In this case, dedicated Ethernet link 503 is connected between layer 2 switch SW (#0) $210_0$ and layer 2 switch SW (#1) $210_1$, and when layer 2 switch SW (#0) $210_0$ changes from the active state to the standby state, a reading circuit (not shown) in layer 2 switch SW (#0) $210_0$ reads all IP packets held in layer 2 switch SW (#0) $210_0$, and layer 2 switch SW (#1) $210_1$ acquires all the read IP packets and distributes them to the cards. With this arrangement, even if layer 2 switch SW (#0) $210_0$ suffers a fault of a substantial scale and has difficulty sending IP packets held in layer 2 switch SW (#0) $210_0$ by itself, it is possible to switch between the layer 2 switches for distributing IP packets without causing a packet loss.

In the present embodiment, the layer 2 switch switching circuit has signal line SW_EMP#0B $502_0$ and signal line SW_EMP#1B $502_1$ between layer 2 switch SW (#0) $210_0$ and layer 2 switch SW (#1) $210_1$ for indicating that the internal buffer of the companion layer 2 switch is empty. However, some switch devices serving as layer 2 switches are unable to monitor whether the internal buffer is empty or not. With such switch devices, a maximum transmission time required until the transmission of all the packets held by the internal buffer of the companion layer 2 switch is completed is calculated in advance based on the maximum storage capacity of the internal buffer, and when the maximum transmission time elapses after the companion layer 2 switch has changed to the standby state, IP packets held by the internal buffer start being sent out regardless of the number of those IP packets. The sequence of IP packets is thus prevented from being scrambled.

While preferred embodiments of the present invention have been described using specific terms, such description is for illustrative purposes only, and it is to be understood that changes and variations may be made without departing from the spirit or scope of the following claims.

What is claimed is:

1. A layer 2 switch switching circuit comprising:
two layer 2 switches in a redundant configuration; and
a plurality of cards for sending IP packets to each other through either one of said two layer 2 switches;
each of said two layer 2 switches having a state signal delivery unit for delivering a state signal representing whether the layer 2 switch is in an active state or a standby state;
each of said cards having a card controller for monitoring states of said two layer 2 switches based on state signals sent respectively from said two layer 2 switches, and switching between said two layer 2 switches as a destination of IP packets based on the monitored states;
each of said two layer 2 switches including
(i) an internal buffer for temporarily storing IP packets; and
(ii) a switch controller for monitoring the state of the other layer 2 switch based on the state signal delivered from the other layer 2 switch, stopping sending IP packets to the corresponding card when a transition of the other layer 2 switch from the active state to the standby state is detected, and resuming sending IP packets to the corresponding card when the other layer 2 switch completes sending all IP packets held by the internal buffer thereof.

2. A layer 2 switch switching circuit according to according to claim 1, wherein if said switch controller receives IP packets from said cards while said switch controller is stopping sending IP packets to the corresponding card when the transition of the other layer 2 switch from the active state to the standby state is detected, said switch controller stores the received IP packets in said internal buffer, and said switch controller resumes sending the IP packets stored in said internal buffer to the corresponding card when the other layer 2 switch completes sending all IP packets held by the internal buffer thereof.

3. A layer 2 switch switching circuit according to claim 1, wherein each of said two layer 2 switches further comprises:
a buffer state signal delivery unit for delivering a buffer state signal representing whether said internal buffer is storing IP packets or not;
wherein said switch controller determines whether the other layer 2 switch has completed sending all IP packets held by the internal buffer thereof or not, based on the buffer state signal delivered by said buffer state signal delivery unit of the other layer 2 switch.

4. A layer 2 switch switching circuit according to claim 1, wherein said switch controller calculates in advance a maximum transmission time required for the other layer 2 switch to complete sending all IP packets held by the internal buffer thereof, based on a maximum storage, capacity of the internal buffer of the other layer 2 switch, and determines whether the other layer 2 switch has completed sending all IP packets held by the internal buffer thereof or not, depending on whether said maximum transmission time has elapsed or not when the transition of the other layer 2 switch from the active state to the standby state is detected.

5. A base station apparatus comprising:
two layer 2 switches in a redundant, configuration; and
a plurality of cards for sending IP packets to each other through either one of said two layer 2 switches;
each of said two layer 2 switches having a state signal delivery unit for delivering a state signal representing whether the layer 2 switch is in an active state or a standby state;
each of said cards having a card controller for monitoring states of said two layer 2 switches based on state signals sent respectively from said two layer 2 switches, and switching between said two layer 2 switches, as a destination of IP packets based on the states;
each of said two layer 2 switches including
(i) an internal buffer for temporarily stoking IP packets; and
(ii) a switch controller for monitoring the state of the other layer 2 switch based on the state signal delivered from the other layer 2 switch, stopping sending IP packets to the corresponding card when a transition of the other layer 2 switch from the active state to the standby state is detected, and resuming sending IP packets to the corresponding card when the other layer 2 switch completes sending all IP packets held by the internal buffer thereof.

6. A base station apparatus according to claim 5, wherein if said switch controller receives IP packets from said cards while said switch controller is stopping sending IP packets to the corresponding card when the transition of the other layer 2 switch from the active state to the standby state is detected, said switch controller stores the received IP packets in said internal buffer, and said switch controller resumes sending the IP packets stored in said internal buffer to the corresponding card when the other layer 2 switch completes sending all IP packets held by the internal buffer thereof.

7. A base station apparatus according to claim 5, wherein each of said two layer 2 switches further comprises:
a buffer state signal delivery unit for delivering a buffer state signal representing whether said internal buffer is storing IP packets or not;
wherein said switch controller determines whether the other layer 2 switch has completed sending all IP packets held by the internal buffer thereof or not, based on the buffer state signal delivered by said buffer state signal delivery unit of the other layer 2 switch.

8. A base station apparatus according to claim 5, wherein said switch controller calculates in advance a maximum transmission time required for the other layer 2 switch to complete sending all IP packets held by the internal buffer thereof, based on a maximum storage capacity of the internal buffer of the other layer 2 switch, and determines whether the other layer switch 2 has completed sending all IP packets held by the internal buffer thereof or not, depending on whether said maximum transmission time has elapsed or not when the transition of the other layer 2 switch from the active state to the standby state is detected.

9. A method of switching between layer 2 switches with a layer 2 switch switching circuit having two layer 2 switches in a redundant configuration, and a plurality of cards for sending IP packets to each other through either one of said two layer switches, comprising the steps of:
delivering, from each of said two layer 2 switches; a state signal representing whether said each layer 2 switch is in an active state or a standby state;
monitoring states of said two layer 2 switches based on state signals sent respectively from said two layer 2 switches, and switching between said two layer 2 switches as a destination of IP packets based on the monitored states; and
stopping sending IP packets from each of said two layer 2 switches to the corresponding card when a transition of the other layer 2 switch from the active state to the standby state is detected, and resuming sending IP packets to the corresponding card when the other layer 2 switch completes sending all IP packets held by the internal buffer thereof.

10. A method according to claim 9, wherein if IP packets are received front said cards while each of said two layer 2 switches is stopping sending IP packets to the corresponding card when the transition of the other layer 2 switch from the active state to the standby state is detected, the received IP packets are stored in said internal buffer, and the IP packets stored in said internal buffer are sent again to the corresponding card when the other layer 2 switch completes sending all IP packets held by the internal buffer thereof.

11. A method according to claim 9, further comprising the step of:

delivering a buffer state signal representing whether said internal buffer is storing IP packets or not, from each of said two layer 2 switches;

wherein each of said two layer 2 switches determines whether the other layer 2 switch has completed sending all IP packets held by the internal buffer thereof or not, based on the buffer state signal delivered from the other layer 2 switch.

12. A method according to claim 9, further comprising the steps of:

calculating in advance a maximum transmission time required for the other layer 2 switch to complete sending all IP packets held by the internal buffer thereof, based on a maximum storage capacity of the internal buffer of the other layer 2 switch, and determining whether the other layer 2 switch has completed sending all IP packets held by the internal buffer thereof or not, depending on whether said maximum transmission time has elapsed or not when the transition of the other layer 2 switch from the active state to the standby state is detected.

* * * * *